United States Patent
Hosp et al.

(10) Patent No.: US 12,307,424 B2
(45) Date of Patent: May 20, 2025

(54) SYSTEMS AND METHODS FOR MULTI ACCESS CHANNELS FOR AUTHENTICATION AND CONSENTS

(71) Applicant: Mastercard International Incorporated, Purchase, NY (US)

(72) Inventors: Adam Kenneth Hosp, Lake St. Louis, MO (US); Oran Cummins, Dublin (IE); Michael Hoole, Epsom (GB); Ahmed Hosny, Dublin (IE); Ishfaq Lone, Dublin (IE); Marco Vicente, Dublin (IE); Piyushkumar Kanubhai Hirpara, Dublin (IE); Kosta Krauth, New York, NY (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 17/490,520

(22) Filed: Sep. 30, 2021

(65) Prior Publication Data

US 2022/0108284 A1     Apr. 7, 2022

Related U.S. Application Data

(60) Provisional application No. 63/086,082, filed on Oct. 1, 2020, provisional application No. 63/232,880, filed
(Continued)

(51) Int. Cl.
*G06Q 20/02*     (2012.01)
*G06Q 20/32*     (2012.01)
(Continued)

(52) U.S. Cl.
CPC ......... *G06Q 20/02* (2013.01); *G06Q 20/3255* (2013.01); *G06Q 20/34* (2013.01);
(Continued)

(58) Field of Classification Search
CPC ................. G06Q 20/02; G06Q 20/385; G06Q 20/40975; G06Q 40/02
See application file for complete search history.

(56) References Cited

U.S. PATENT DOCUMENTS

| | | |
|---|---|---|
| 7,685,206 B1 | 3/2010 | Mathew et al. |
| 8,935,757 B2 | 1/2015 | Srinivasan et al. |
| | (Continued) | |

OTHER PUBLICATIONS

W. Liu, X. Wang and W. Peng, "State of the Art: Secure Mobile Payment," in IEEE Access, vol. 8, pp. 13898-13914, 2020, doi: 10.1109/ACCESS.2019.2963480. (Year: 2019).*
(Continued)

*Primary Examiner* — David P Sharvin
*Assistant Examiner* — Steven R Chism
(74) *Attorney, Agent, or Firm* — Hovey Williams LLP

(57) ABSTRACT

A computer system includes a database, a communication interface, and a processor(s). The processor(s) is programmed to receive a consent message from a cardholder computing device. The consent message includes cardholder consent information indicating consent to one or more data services. The processor(s) is also programmed to decrypt transaction card details included in a secure request message. The transaction card details correspond to a transaction card of a cardholder and are associated with a financial account of the cardholder. Based on the transaction card details, the processor(s) generates a digital access token. The digital access token is associated with the financial account and the cardholder consent information. The processor(s) stores the digital access token in the database, transmits a cardholder authentication request message to an issuer, and receives an authentication ID from the cardholder computing device. The processor(s) authenticates the cardholder and transmits the digital access token to a third party provider.

4 Claims, 8 Drawing Sheets

Related U.S. Application Data on Aug. 13, 2021, provisional application No. 63/232,895, filed on Aug. 13, 2021.

(51) Int. Cl.

| | | |
|---|---|---|
| *G06Q 20/34* | (2012.01) | |
| *G06Q 20/38* | (2012.01) | |
| *G06Q 20/40* | (2012.01) | |
| *G06Q 20/42* | (2012.01) | |
| *G06Q 40/02* | (2023.01) | |
| *H04L 9/40* | (2022.01) | |

(52) U.S. Cl.
CPC ....... *G06Q 20/382* (2013.01); *G06Q 20/3821* (2013.01); *G06Q 20/385* (2013.01); *G06Q 20/401* (2013.01); *G06Q 20/4014* (2013.01); *G06Q 20/40975* (2013.01); *G06Q 20/42* (2013.01); *G06Q 40/02* (2013.01); *H04L 63/083* (2013.01)

(56) References Cited

U.S. PATENT DOCUMENTS

| | | | |
|---|---|---|---|
| 10,673,843 B2* | 6/2020 | Cho | H04L 63/0838 |
| 10,692,138 B1 | 6/2020 | Nguyen et al. | |
| 11,017,398 B2* | 5/2021 | Potadar | H04L 63/10 |
| 11,308,483 B2* | 4/2022 | Prabhu | G06Q 20/3674 |
| 2012/0117626 A1 | 5/2012 | Yates et al. | |
| 2015/0039728 A1 | 2/2015 | Philippe | |
| 2015/0121462 A1 | 4/2015 | Courage et al. | |
| 2015/0127547 A1 | 5/2015 | Powell et al. | |
| 2016/0078428 A1 | 3/2016 | Moser et al. | |
| 2016/0092696 A1 | 3/2016 | Guglani et al. | |
| 2016/0307196 A1 | 10/2016 | Achhra et al. | |
| 2019/0122209 A1* | 4/2019 | Shah | H04L 9/3213 |
| 2019/0333055 A1* | 10/2019 | Mohammed | H04L 9/3234 |

OTHER PUBLICATIONS

G. Thawre, N. Bahekar and B. R. Chandavarkar, "Use Cases of Authentication Protocols in the Context of Digital Payment System," 2020 11th International Conference on Computing, Communication and Networking Technologies (ICCCNT), Kharagpur, India, 2020, pp. 1-6, doi: 10.1109/ICCCNT49239.2020.9225428. (Year: 2020).*

International Search Report and Written Opinion for PCT Application No. PCT/US2021/051190 (Dated Feb. 24, 2022).

Office Action from U.S. Appl. No. 17/490,413 (dated Oct. 3, 2023).

* cited by examiner

SYSTEMS AND METHODS FOR MULTI ACCESS CHANNELS FOR AUTHENTICATION AND CONSENTS

PRIORITY APPLICATIONS

The present application claims priority from U.S. Provisional Patent Application No. 63/086,082, filed Oct. 1, 2020, and entitled SYSTEMS AND METHODS FOR SECURELY OPENING APIS WITH CARDHOLDER AUTHENTICATION AND CONSENT; U.S. Provisional Patent Application No. 63/232,880, filed Aug. 13, 2021, and entitled SYSTEMS AND METHODS FOR MULTI ACCESS CHANNELS FOR AUTHENTICATION AND CONSENTS; and U.S. Provisional Patent Application No. 63/232,895, filed Aug. 13, 2021, and entitled SYSTEMS AND METHODS FOR CONSENT MANAGEMENT BY ISSUERS ON BEHALF OF CARDHOLDERS. The entire disclosure of each of the aforementioned priority applications is hereby incorporated by reference herein.

FIELD OF THE DISCLOSURE

The field of the disclosure relates to cardholder authentication and consent systems, and more particularly, to generating digital access tokens based on cardholder authentication and consent, where the digital access tokens are linked to application programming interface (API) calls to retrieve cardholder financial data.

BACKGROUND

The open banking concept in financial services is based, in part, on the use of open APIs allowing financial technology companies (Fintechs) and third party providers (TPPs) to build applications and services around financial institutions, increased financial transparency options for account holders, and the use of open source technology to implement these services and results. To provide such services, the Fintechs/TPPs require access to a cardholder's account data. However, cardholder authentication and consent is required before allowing Fintechs/TPPs access to cardholder data.

At least some known Fintechs/TPPs use a screen scraping approach to collect cardholder account data. Screen scraping is a process in which cardholders give Fintechs/TPPs their account credentials so the Fintechs/TPPs can log in and import account data into other programs. Screen scraping, however, can be unsafe. Providing online banking credentials to third parties exposes cardholders to the risk that a fraudster posing as a Fintech/TPP will dupe them, that a hacker will break into a Fintech's/TPP's system and steal the credentials, or that a rogue employee will abuse the access. Furthermore, providing online banking credentials to third parties could prevent banks from requiring certain kinds of multifactor authentication, such as biometrics. In addition, having a cardholder's online banking credentials allows the Fintechs/TPPs to take more consumer data than may be needed.

At least some banks provide cardholder account data to Fintechs/TPPs through an API gated by OAuth. OAuth is an open standard for token-based authentication and authorization on the Internet. Typically, with OAuth, a cardholder logs in to the Fintech/TPP (e.g., via an App) and is redirected to the cardholder's bank to authorize the Fintech/TPP to receive certain account data. However, in such a scenario, each bank must implement the OAuth standard in order for a Fintech/TPP to access cardholder account data. In addition, each Fintech/TPP must communicate directly with each bank associated with a cardholder account. The OAuth standard does not provide for Fintechs/TPPs to retrieve cardholder data from a single repository, such as an interchange network, when cardholder authentication is typically managed by the cardholder's bank.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, computing system is provided. The system includes a database, a communication interface, and a processor. The processor is programmed to perform operations including receiving, via the communication interface, a secure request message from a third party provider (TPP) computing device. The secure request message includes encrypted transaction card details corresponding to a transaction card of a cardholder. The transaction card details are associated with a financial account of the cardholder. The processor is programmed for receiving, via the communication interface, a consent message from a cardholder computing device. The consent message includes cardholder consent information indicating consent to one or more data services. The processor is also programmed to decrypt the encrypted transaction card details. Further, the processor is programmed to transmit, via the communication interface, a cardholder authentication request message to an issuer computing device of an issuer of the transaction card. The processor is also programmed to receive, via the communication interface, an authentication identifier (ID) from the cardholder computing device, and, based on the received authentication ID, authenticating the cardholder. In addition, the processor is programmed to generate, based on authenticating the cardholder and the transaction card details, a digital access token by a token service system. The digital access token is associated with the financial account and the cardholder consent information. Moreover, the processor is programmed to store the digital access token in the database, and transmit, via the communication interface, the digital access token to the TPP computing device based on authenticating the cardholder.

In another aspect, another computing system is provided. The system includes a database, a communications interface, and a processor. The communication interface receives, from a third party provider (TPP) computing device, a secure request message. The secure request message includes a transaction card token corresponding to a transaction card of a cardholder and being associated with a financial account of the cardholder. The processor is programmed to receive, via the communication interface, a consent message from a cardholder computing device. The consent message includes cardholder consent information indicating consent to one or more data services. The processor is also programmed to extract the transaction card token from the secure request message and generate a digital access token by a token service system. The digital access token is associated with the financial account and the cardholder consent information. Furthermore, the processor is programmed to store the digital access token in the database, and transmit, via the communication interface, the digital access token to the TPP computing device based on authenticating the cardholder.

In yet another aspect, a computing system is provided. The computing system includes a database, a communication interface, and a processor. The processor is programmed to perform operations comprising receiving, from a third party provider (TPP) computing device by the communication interface, a first application programming interface (API) call. The first API call includes cardholder consent information and encrypted transaction card details corresponding to a transaction card of a cardholder and being associated with a financial account of the cardholder. The processor is programmed to decrypt the encrypted transaction card details, and transmit, to the TPP computing device by the communication interface, a message including a session identifier (ID). The processor is also programmed to receive, from the TPP computing device by the communication interface, a second API call. The second API call includes the session ID and a request to authenticate the cardholder. Moreover, the processor is programmed to transmit, by the communication interface, a cardholder authentication request message to an issuer computing device of an issuer of the transaction card, and receive, from the TPP computing device by the communication interface, a third API call. The third API call includes the session ID and an authentication ID. The processor is programmed to authenticate the cardholder based on the received authentication ID. Based on authenticating the cardholder and the transaction card details, the processor is programmed to generate a digital access token by a token service system. The digital access token is associated with the financial account and the cardholder consent information. Furthermore, the processor is programmed to store the digital access token in the database, and transmit, by the communication interface, the digital access token to the TPP computing device based on authenticating the cardholder.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
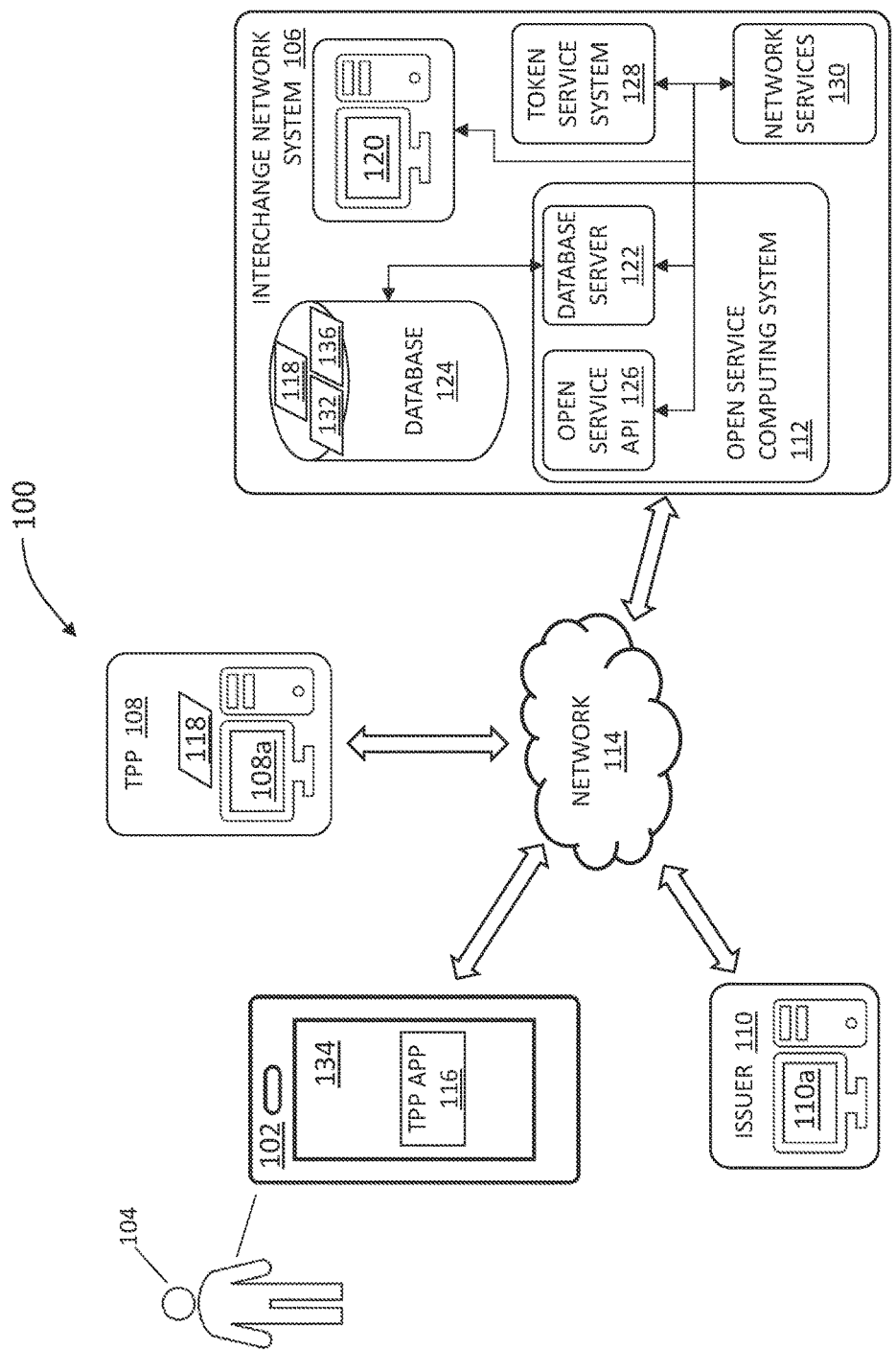
FIG. 1 is a block diagram of an example multi-party network system including a cardholder computing device belonging to a cardholder (or consumer), in accordance with one embodiment of the present disclosure.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

As used herein, the terms "payment card," "transaction card," and "financial transaction card," may include any suitable transaction card, such as a credit card, a debit card, a charge card, a membership card, a promotional card, an identification card, a prepaid card, a gift card, and/or any other card-type device that may hold payment account information. Each type of transaction card can be used as a method of payment for performing a transaction.

Furthermore, as used herein, the term "real-time" includes at least one of the times of occurrence of the associated events, the time of collection of data, the time to process the data, and the time of a system response to the events and the environment. For the activities and the events in the embodiments described herein as occurring in real-time, it should be assumed that they occur substantially instantaneously.

Exemplary Access Token System

FIG. 1 is a block diagram of an example multi-party network system 100, including a cardholder computing device 102 (e.g., a mobile computing device) belonging to a cardholder (or consumer) 104, in accordance with one embodiment of the present disclosure. In the exemplary embodiment, the network system 100 provides interchange network services offered by one or more payment networks, such as interchange network system 106. In addition, the network system 100 enables financial data transactions and services related to transaction cards in which cardholders 104, third party providers (TPPs) 108 (also may be referred to herein as Fintechs), and card issuers (e.g., issuer 110) do not need to have a one-to-one relationship. Although parts of the network system 100 are presented in one arrangement, other embodiments may include the same or different parts arranged otherwise, depending, for example, on authentication and consent processes, communication between computing devices, etc.

It is noted that Fintechs and TPPs, such as TPP 108, provide cardholders, such as cardholder 104, access to new products and services related to a cardholder's financial accounts. TPPs/Fintechs include, for example, account information service providers (AISPs), payment initiation service providers (PISPs), etc. Examples include PayPal®, Square®, Stripe®, etc. In order for the TPPs/Fintechs to provide account services to a cardholder, the TPPs/Fintechs require access to the cardholder's financial information.

In the example embodiment, the network system 100 generally includes the cardholder computing device 102, the interchange network system 106 including an open service computing system 112, the TPP 108 (via a third party provider computing device 108a), and the issuer 110 (via an issuer computing device 110a) coupled in communication via a communications network 114. The network 114 includes, for example and without limitation, one or more of a local area network (LAN), a wide area network (WAN) (e.g., the Internet, etc.), a mobile network, a virtual network, and/or any other suitable public and/or private network capable of facilitating communication among the cardholder computing device 102, the open service computing system 112, the interchange network system 106, the issuer 110, and/or the TPP 108. In some embodiments, the network 114 includes more than one type of network, such as a private transaction network provided by the interchange network system 106 to the TPP 108, and the issuer 110, and, separately, the public Internet, which may facilitate communication between the cardholder computing device 102, the TPP 108, the issuer 110, the open service computing system 112, and/or the interchange network system 106, etc.

Embodiments described herein relate to transaction card systems, such as a credit card payment system using the Mastercard® interchange network. (Mastercard is a registered trademark of Mastercard International Incorporated.) The Mastercard interchange network is a set of proprietary communications standards promulgated by Mastercard International Incorporated for the exchange of financial transaction data and the settlement of funds between financial institutions that are members of Mastercard International Incorporated.

With continued reference to FIG. 1, in the exemplary embodiment, the cardholder computing device 102 (e.g., a smartphone or other computing device used by the cardholder 104) includes a user interface 134 that facilitates user interaction with the respective cardholder computing device 102. For example, and without limitation, the user interface 134 enables the cardholder 104 to input data to the cardholder computing device 102, and the cardholder computing device 102 to present (e.g., output) information to the cardholder 104 (e.g., on a display of the cardholder computing device 102). The user interface 134 includes, for example, one or more TPP Applications 116 (broadly, a TPP App), which is installed on the cardholder computing device 102. In the exemplary embodiment, the TPP App 116 provides communication to the TPP 108 (via the TPP computing device 108a) and various financial services to the cardholder 104 via the TPP 108. It is contemplated that fewer or more TPP Apps may be installed on the cardholder computing device 102 and displayed by the user interface 134, where each TPP App is associated with at least one financial service provider (e.g., the TPP 108).

In the exemplary embodiment, the cardholder computing device 102 communicates with one or more of the issuer 110 (via the issuer computing device 110a) and the TPP 108 (via the TPP computing device 108a), for example, via the network 114. In addition, the cardholder computing device 102 communicates with the open service computing system 112, for example, via the network 114, to exchange and/or synchronize authentication, consent, and/or financial account data via the TPP App 116. The open service computing system 112 accesses the network 114 to communicate with the cardholder computing device 102, the issuer 110, and the TPP 108 to facilitate the establishment of one or more digital access tokens 118, and the exchange of cardholder financial account data with the issuer 110 and the TPP 108.

The cardholder computing device 102 can be any computing device capable of interconnecting to the network 114, such as the Internet, including a desktop computer, laptop, mobile web-based device, smartphone, PDA, or other mobile web-based connectable equipment. The cardholder computing device 102 is interconnected to the Internet through one or more interfaces including a network, such as a local area network (LAN) or a wide area network (WAN), dial-in-connections, cable modems, wireless modems, and special high-speed ISDN lines. In addition, in the example embodiment, the cardholder computing device 102 is configured to communicate with other cardholder computing devices (not shown) and/or merchant point-of-sale (POS) systems (not shown) using various forms of communication including, for example, radio frequency communication, near field communication (NFC), network-based communication, and the like.

The network system 100 includes, for example, and without limitation, one or more computers, servers, networks of multiple computing devices, virtual computing devices, and the like. In addition, in the exemplary embodiment, the network system 100 also includes one or more payment network server systems 120 (also referred to as a payment system), which is part of the interchange network system 106 and is coupled in communication to the network 114. The payment system 120 is a computing system including, for example, a web application server, an application programming interface (API) server, and a memory device, enabling the interchange network system 106 to be in communication with the open service computing system 112 using, for example, and without limitation, an internal network and/or the Internet. The payment system 120 is interconnected to the Internet through one or more interfaces including a network, such as a local area network (LAN) or a wide area network (WAN), dial-in-connections, cable modems, and special high-speed ISDN lines. The payment system 120 can be any computing device capable of interconnecting to the Internet. In certain embodiments of the present invention, the open service computing system 112 is integrated with or is otherwise a part of the payment network server system 120.

The open service computing system 112 includes, for example, a database server 122, which is connected to a database 124. In one embodiment, the database 124 is stored on the open service computing system 112. In an alternative embodiment, the database 124 may be stored remotely from the open service computing system 112 and/or may be non-centralized. The database 124 is configured to receive and store, at least, one or more digital access tokens 118, account data and/or information associating respective access tokens 118 to respective cardholder accounts, cardholder consent data associated with the respective access tokens 118, and/or other data or information associated with the digital access tokens 118 (e.g., token status, expiry date, authorized TPP, etc.).

Furthermore, the open service computing system 112 includes an open service application programming interface (API) 126. In the exemplary embodiment, the open service API 126 facilitates the creation of the digital access token 118 for the TPP 108. In certain embodiment, the open service API 126 also facilitates obtaining cardholder consent for creating the digital access token 118, obtaining cardholder account data, and authenticating the cardholder 104. The open service API 126 stores the digital access tokens 118 and associated data or information in the database 124.

In the exemplary embodiment, the cardholder computing device 102 is used to run the TPP App 116, which establishes a connection with an associated TPP 108, for example, via the network 114. The TPP 108 may provide financial services to the cardholder 104 via the TPP App 116. To provide the financial services, the TPP 108 may require access to certain cardholder financial account data (e.g., transaction alerts, transaction history, virtual card numbers, card controls, etc.) that is stored or held by the interchange network system 106. However, because the cardholder financial account data belongs to the cardholder, it is generally only shared with the issuer of the cardholder's transaction card/account, such as the issuer 110. To gain access to the cardholder financial account data, the TPP 108 must receive consent from the cardholder 104.

The TPP 108 may or may not have a relationship with the interchange network system 106. TPPs that do not have a relationship with the interchange network system 106 may be considered "untrusted," and as such, the interchange network system 106 fully controls the cardholder experience when a cardholder selects to grant access to his or her financial account data. In such instances, the interchange network system 106, via the open service API 126, controls the user interface 134 via one or more lightbox popup windows presented on the cardholder computing device 102.

In one suitable embodiment, the cardholder 104 may have an existing relationship with the TPP 108 and may have linked one or more transaction card accounts with the TPP service, for example, via the TPP App 116. In such instances, the TPP 108 may have the transaction card account details of the cardholder 104 stored on file (e.g., card-on-file) either as general card details (e.g., primary account number (PAN), expiry date, CVV, etc.) or as a transaction card token (e.g., transaction card tokenized by the interchange network system 106 or the issuer 110). Generally, if the TPP 108 wishes to store a cardholder's account data, the TPP 108 must be compliant with the Payment Card Industry Data Security Standard (PCI DSS). The PCI DSS is an information security standard for organizations that handle transaction cards. The PCI DSS was created to increase controls around cardholder data to reduce credit card fraud.

In one example embodiment, in order to gain access to the cardholder's financial account data, the untrusted TPP 108 requests permission from the cardholder 104 to register the transaction card account and receive the financial account data. The TPP 108 communicates with the open service computing system 112 and transmits a secure request message to authenticate the cardholder and receive access to cardholder financial account data. For example, the TPP 108 may generate a JSON web token (JWT) and launch a webSDK with the JWT within the TPP App 116. The JWT may contain information concerning the access the TPP 108 is requesting and the encrypted transaction card account details of the cardholder transaction card account the TPP 108 has on file. The information concerning the access the TPP 108 is requesting may include, for example, a request for access to one or more of a cardholder's transaction alerts, transaction history, virtual card numbers, card controls, etc., all of which are associated with the encrypted transaction card account details.

The open service API 126 receives the secure request message and communicates with the cardholder computing device 102 to retrieve cardholder consent. For example, in one embodiment, the open service API 126 presents to the cardholder 104, via a lightbox popup window, a list of the data services to which the TPP App 116 is requesting access. The cardholder 104 may consent to granting access to one or more of the requested data services. In one embodiment, the cardholder 104 may simply transmit a consent message to the open service API 126, for example, by pressing an icon on the user interface of the TPP App 116. The consent message includes one or more data fields including cardholder consent information indicating consent to one or more data services requested by the TPP 108 and offered by the interchange network system 106, where each data field corresponds to a respective one of the data services. In another embodiment, the cardholder 104 may select one or more of the requested data services and transmit a consent message including only those data fields corresponding to the cardholder selected data services.

Upon receipt of the cardholder's consent message, the open service computing system 112 analyzes the received data, for example, to determine the data services to which the cardholder 104 consented to being accessed by the TPP 108. The open service API 126, via the open service computing system 112, then requests a token service system 128 to tokenize the card details received from the TPP 108. In the exemplary embodiment, the interchange network system 106 includes the token service system 128, which is configured to generate or assign one or more access tokens, such as access token 118, to respective cardholder transaction card accounts. The token service system 128 generates or assigns a digital access token to be associated with the cardholder's transaction card and creates an association mapping between the digital access token and the transaction card. The token service system 128 stores the token-to-card mapping data (e.g., in a data mapping table 136) in a database, such as the database 124. The token service system 128 then communicates with the issuer 110 to facilitate authenticating the cardholder 104.

In a typical transaction card system, the issuer 110 is the financial institution that issues the transaction card, such as a credit card, to the cardholder 104. In embodiments where the encrypted transaction card account details have not been previously tokenized, using the interchange network 106, the token service system 128 communicates with computers of the issuer 110 to initiate cardholder authentication, for example, by transmitting a cardholder authentication request message. For example, in one embodiment, the token service system 128 generates an authentication identifier (ID), such as a one-time password (OTP), and transmits it to the issuer 110 with the cardholder authentication request message. The issuer 110 subsequently transmits the authentication ID (or OTP) to the cardholder computing device 102. To authenticate the cardholder, the open service computing system 112 requests the authentication ID from the cardholder, for example, via the TPP App 116. If the authentication ID received from the cardholder computing device 102 matches the authentication ID generated by the token service system 128, the cardholder 104 is considered to be authenticated. In some embodiments, the authentication ID may be generated by the issuer 110. In such embodiments, the token service system 128 receives the authentication ID from the issuer 110 and a subsequent authentication ID from the cardholder computing device 102. A match indicates that the cardholder is authenticated. It is noted that in embodiments where the encrypted transaction card account details include a transaction card token (discussed above), the token service system 128 may forgo the cardholder authentication steps described above.

After authenticating the cardholder 104, or where the encrypted transaction card account details included a transaction card token, the token service system 128 transmits the digital access token (e.g., the digital access token 118) to the TPP 108, for example, via the open service computing system 112, such that the digital access token can be used in subsequent data service requests initiated by the TPP 108. In some embodiments, the open service computing system 112 may receive a digital access token revocation request from one or more of the cardholder 104 and the issuer 110. The revocation request instructs the open service computing system 112 to suspend or otherwise terminate the use of the digital access token by the TPP 108.

In certain aspects of the present invention, a TPP 108 that has established a relationship with the interchange network system 106 may be considered "trusted," and as such, the TPP 108 may use an API approach to request account access and receive the digital access token (e.g., the digital access token 118). Using the API approach, the TPP 108 controls the cardholder experience (e.g., via the user interface 134) when a cardholder, such as the cardholder 104, selects to grant access to his or her financial account data. The API approach allows the TPP 108 to maintain a consistent look-and-feel of the user interface 134 during the process of granting access to the cardholder financial account data. The process is otherwise substantially similar to the process discussed above with respect to an untrusted TPP.

The embodiments illustrated and described herein, as well as embodiments not specifically described herein but within the scope of aspects of the invention, constitute exemplary means for generating and providing a digital access token, such as the digital access token 118, to a third party provider, such as the TPP 108, to access to a cardholder's financial account data. For example, the cardholder computing device 102, the open service computing system 112, the token service system 128, or any other similar computer device(s), specially programmed with computer-executable instructions to execute processes and techniques with a processor as described herein, constitute exemplary means for enabling a cardholder, such as the cardholder 104, to provide his or her transaction card information to a third party provider (e.g., the TPP 108) and consent to the third party provider retrieving certain financial account data of the cardholder 104 from a data store (e.g., the interchange network system 106). The TPP 108 uses a digital access token 118 to access various network services 130 of the interchange network system 106 to retrieve the cardholder's financial account data.

Exemplary Computer Systems

Figure 2:
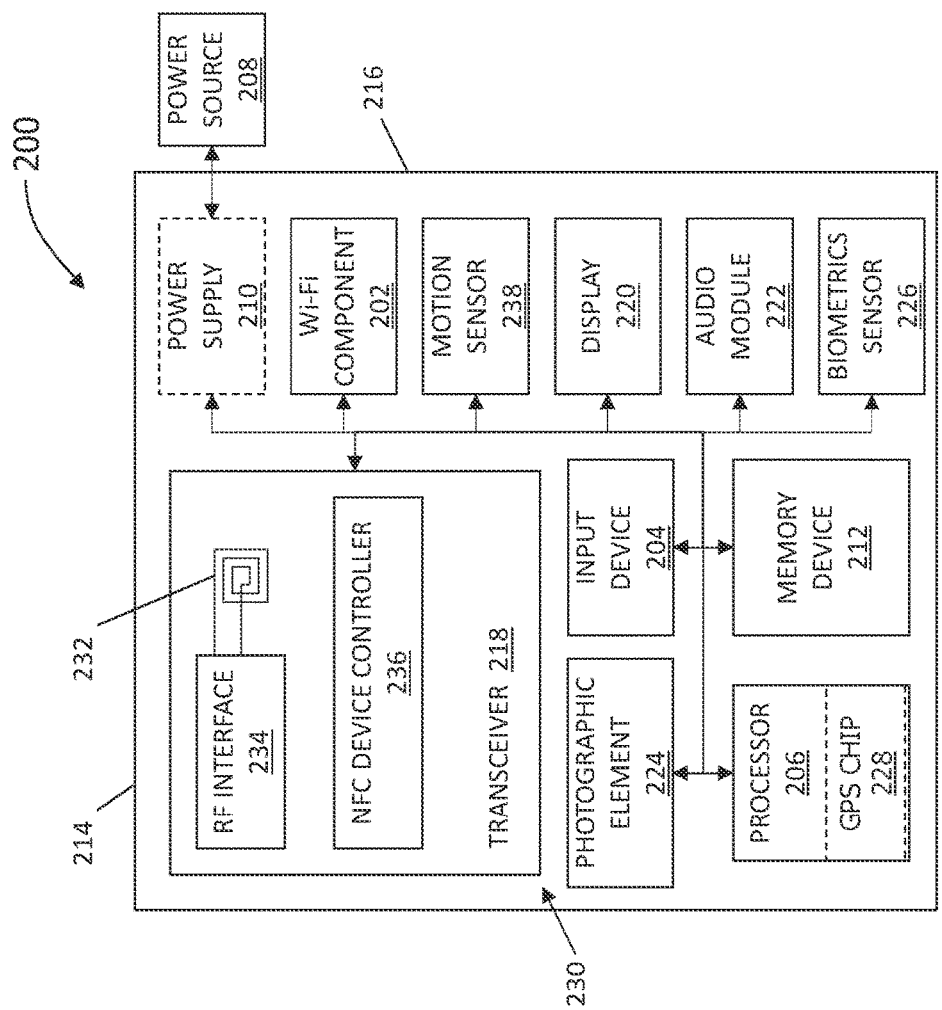
FIG. 2 is an example configuration of the cardholder computing device shown in FIG. 1 that may be operated by a cardholder shown in FIG. 1.

FIG. 2 is an example configuration of a user computing system 200, such as the cardholder computing device 102 (shown in FIG. 1), that may be operated by a user, such as the cardholder 104 (shown in FIG. 1). In the exemplary embodiment, the computing system 200 is a computing device configured to connect to one or more of the open service computing system 112, the issuer 110, the TPP 108, and any other computing devices, such as other customer computing devices (not shown).

In the exemplary embodiment, the computing system 200 generally includes a processor 206, a memory device 212, a transceiver 218 (or a wireless communication device), a photographic element 224, and a biometrics sensor 226. In addition, the computing system 200 includes an integrated Wi-Fi component 202 (e.g., implementing the Institute of Electrical and Electronics/IEEE 802.11 family of standards), an input device 204, a display 220, and an audio module 222. Moreover, the computing system 200 includes an internal power supply 210 (e.g., a battery or other self-contained power source) to receive power, or alternatively, in some embodiments, the computing system 200 may include an external power source 208. Optionally, the computing system 200 may include a motion sensor 238.

The processor 206 includes one or more processing units (e.g., in a multi-core configuration) specially programmed for executing computer readable instructions. The computer readable instructions may be executed within a variety of different operating systems (OS) on the cardholder computing device 102, such as UNIX, LINUX, Microsoft Windows®, etc. More specifically, the computer readable instructions may cause various data manipulations on data stored in the memory device 212 (e.g., create, read, update, and delete procedures). It should also be appreciated that upon initiation of a computer-based method, various computer readable instructions may be executed during initialization. Some operations may be required to perform one or more processes described herein, while other operations may be more general and/or specific to a programming language (e.g., C, C#, C++, Java, or other suitable programming languages, etc.). The memory device 212 is any device allowing information such as the computer readable instructions and/or written works to be stored and retrieved. The memory device 212 includes one or more computer readable media.

In the example embodiment, the processor 206 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for conducting cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 200 may be widely deployed, it may be impractical to manually update software for the computing system 200. Therefore, the network system 100 provides a mechanism for automatically updating the software on the computing system 200. For example, an updating mechanism may be used to automatically update any number of components and their drivers, both network and non-network components, including system level (OS) software components. In some embodiments, the computing system 200 components are dynamically loadable and unloadable; thus, they may be replaced in operation without having to reboot the OS.

A location of the computing system 200 can be obtained, for example, via a location service (e.g., global positioning system (GPS) service) in the computing system 200, "ping" data that includes geotemporal data, from cell location register information held by a telecommunications provider to which the computing system 200 is connected, and the like. For example, in one suitable embodiment, an optional GPS chip 228 can be part of or separate from the processor 206 to enable the location of the computing system 200 to be determined.

Stored in the memory device 212 are, for example, computer readable instructions for providing a user interface, such as the user interface 134, to the user via the display 220 and, optionally, receiving and processing input from the input device 204. A user interface may include, among other possibilities, a web browser and the TPP App 116 (shown in FIG. 1). Web browsers enable users, such as the cardholder 104, to display and interact with media and other information typically embedded on a web page or a website. The TPP App 116 allows the user to interact with computers of the TPP 108 and the open service computing system 112 to provide transaction card details, cardholder consent, and cardholder authentication information thereto.

The photographic element 224 may include a camera or other optical sensor and lens combination capable of generating a video signal and capturing an image. In various embodiments, the photographic element 224 may be integrated in a housing or body, such as a housing 214, of the computing system 200. When the photographic element 224 captures an image or otherwise generates image data (e.g., video data), the photographic element 224 may store the image data in a data file, either in a raw or compressed format, in the memory device 212.

The biometrics sensor 226 is a biometric input device coupled in communication with at least the processor 206 and the memory device 212. The biometrics sensor 226 enables the user to enter a biometric sample. For example, the biometrics sensor 226 is a hardware component and includes, for example, an integral fingerprint or palm reader/scanner, retinal or iris reader/scanner, camera, and/or voice reader/recorder. The user inputs one or more biometrics and stores them as a biometric profile in the memory device 212. The biometrics of the user, such as the cardholder 104, includes one or more scans or digital representations of physical features of the user that are to be validated/authenticated during generation of the digital access token 118. The biometrics or physical features can include, for example, and without limitation, voice, fingerprint, iris, vein pattern, face, or the like. Feature data from a biometric scan or digital representation may be extracted to select features of interest. The biometric profile may be further stored, for example, by the issuer 110 and/or the interchange network system 106 in the database 124.

In some embodiments, the motion sensor 238 may include one or more sensor elements that facilitate detecting a person's presence. For example, if the computing system 200 is operating as the cardholder computing device 102, the motion sensor 238 detects when the cardholder 104 moves or raises the cardholder computing device 102. Upon detection of such motion, the photographic element 224 may begin capturing images (e.g., still or video images), the transceiver 218 may be activated, and/or the audio module 222 may begin capturing audio. The motion sensor 238 may be operatively coupled to the photographic element 224 such that the person's presence may be detected by detecting motion using the photographic element 224. The motion sensor 238 may include, for example, and without limitation, sensor elements such as a passive infrared sensor, an ambient light sensor, and the like.

In the example embodiment, the display 220 can include, for example, and without limitation, a liquid crystal display (LCD), an organic light emitting diode (OLED) display, or an "electronic ink" display. In some embodiments, a single component such as a touch screen may function as both an output device (e.g., the display 220) and the input device 204. As such, the display 220 may optionally include a touch controller for support of touch capability. In such embodiments, the computing system 200 may detect a person's presence by detecting that the person has touched the display 220 of the computing system 200.

The audio module 222 may include, for example, and without limitation, a speaker and related components capable of broadcasting streaming and/or recorded audio and may also include a microphone. The microphone facilitates capturing audio through the computing system 200.

In the example embodiment, the computing system 200 includes the housing 214 at least partly (and more preferably, at least substantially or entirely) enclosing the components described above. In addition, the computing system 200 includes circuitry 230 configured to communicate with the network 114 (shown in FIG. 1) and/or other computing devices (e.g., other cardholder computing devices, the open service computing system 112, the issuer 110, the TPP 108, etc.). The circuitry 230 may include, for example, leads, connectors, NFC-enabled circuitry, Wi-Fi-enabled circuitry, and photographic element circuitry. The housing 214 is preferably configured to seal the circuitry 230, which is susceptible to degradation from the ambient environment. In one embodiment, the circuitry 230 is hermetically sealed in the housing 214. For example, in one embodiment, the circuitry 230 is completely and permanently encased within the housing 214. In other words, the housing 214 and the circuitry 230 are intended to remain as a single, inseparable unit throughout the life of the cardholder computing device 102. It is understood that the housing 214 can be formed separately from the circuitry 230 and that the circuitry 230 can be placed into and sealed within the housing 214 in a separate operation. It is also understood that the housing 214 can be oversized with respect to the circuitry 230 so that the circuitry 230 can be placed loosely into the housing 214. In another embodiment, the circuitry 230 can be selectively, sealingly enclosed within the housing 214, where the housing 214 includes a closure 216 removably attached to a body of the housing 214.

The housing 214 is fabricated from a suitably selected material that facilitates inhibiting the effect the material has on the signal being emitted from, for example, the transceiver 218 and/or the Wi-Fi component 202 and passing through the housing material. For example, and without limitation, suitable materials from which the housing 214 may be fabricated include polyethylene, propylene, isoprene, and butylenes (i.e., polyolefins). In other embodiments, the housing 214 is fabricated from any material that enables the computing system 200 to function as described herein, such as metals, etc.

In one embodiment, the transceiver 218 includes an antenna 232. The antenna 232 includes a looped wire configured to transmit radio signals when current flows through the looped wire. The antenna 232 is any size, shape, and configuration that is suitable for transmitting signals as described herein. For example, the antenna 232 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 232 generates a magnetic field when it vibrates at a selected frequency. Specifically, the antenna 232 is configured to vibrate at a frequency of about 13.56 MHz, which is suitable for use in a near field communication (NFC) system.

In the example embodiment, the antenna 232 transmits radio signals to and receives radio signals from other NFC-enabled computing devices, such as, another cardholder computing device, merchant point-of-sale (POS) systems (not shown), and/or any other components used in NFC systems. In NFC systems, at least one NFC component generates a magnetic field to inductively transfer currents and, thereby, exchange signals and information with other NFC components positioned within the magnetic field. In the exemplary embodiment, the antenna 232 functions as an NFC component to send and receive signals. The antenna 232 is configured to transmit radio signals to NFC components positioned within the magnetic field of the antenna 232, such as when the cardholder computing device 102 is located within a predetermined distance of another cardholder computing device and/or a merchant point-of-sale system (not shown). Therefore, the magnetic field generated by the antenna 232 defines the active range of the computing system 200. Additionally, the antenna 232 receives radio signals from NFC components when the antenna 232 is positioned within the magnetic field of the NFC components.

The transceiver 218 also includes a radio frequency (RF) interface 234 and an NFC device controller 236. The RF interface 234 and the NFC device controller 236 are powered by the power source 208, and in some embodiments, the internal power supply 210 and/or the display 220. In addition, the processor 206 and the memory device 212 are powered in the same manner. The RF interface 234 is configured to receive and transmit RF signals through the antenna 232. The NFC device controller 236 is configured to process the received RF signals and to generate signals to be transmitted by the RF interface 234. The memory device 212 is configured to store data associated with transmitting and receiving the RF signals. The NFC device controller 236 is coupled in communication with the processor 206.

In some embodiments, the computing system 200 may be connected to one or more peripheral devices (not shown). That is, the computing system 200 may communicate various data with one or more peripheral devices. For example, the computing system 200 may communicate with one or more peripheral devices through the Wi-Fi component 202, the transceiver 218, or other suitable means.

Figure 3:
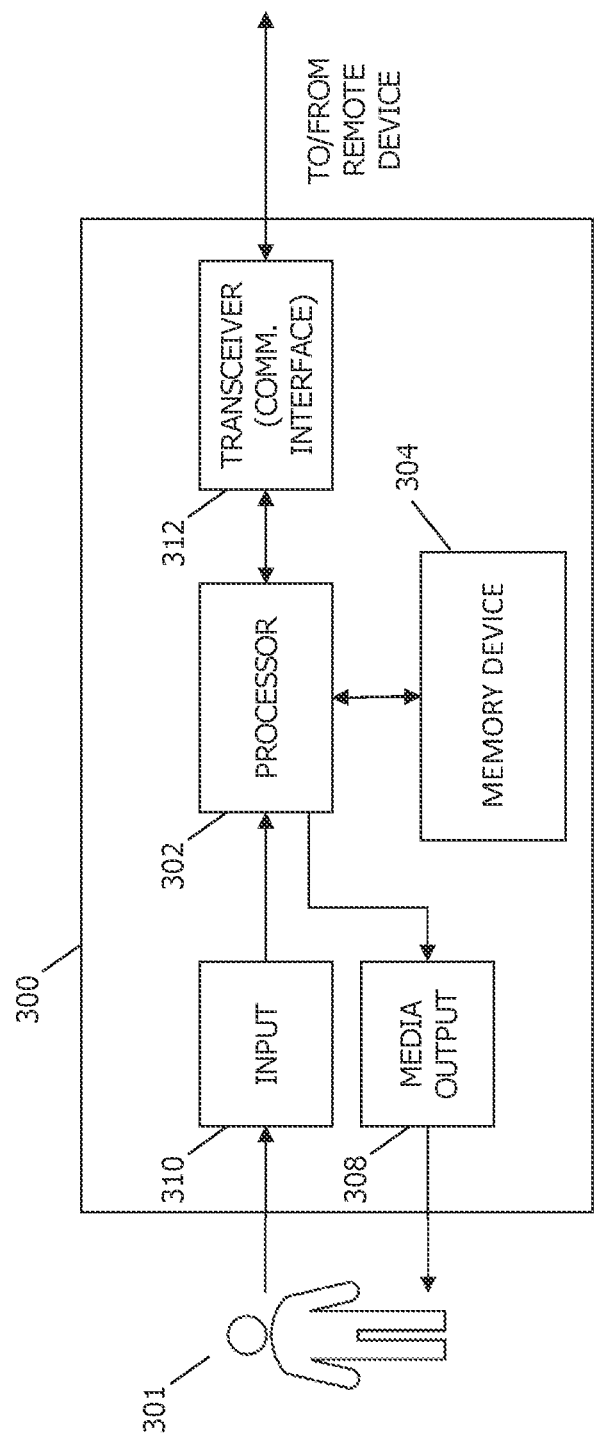
FIG. 3 is an example configuration of a computing system for use in the network system shown in FIG. 1.

FIG. 3 is an example configuration of a computing system 300 operated by a user 301. In some embodiments, the computing system 300 is the open service computing system 112 (shown in FIG. 1), the payment system 120 (shown in FIG. 1), and/or a computing system of the TPP 108 or issuer 110.

In the example embodiment, the computing system 300 includes one or more processors 302 for executing computer readable instructions. In some embodiments, computer readable instructions are stored in a memory device 304. The processor 302 may include one or more processing units arranged, for example, in a multi-core configuration. The memory device 304 is any device allowing information such as executable instructions, data, and/or written works to be stored and retrieved. The memory device 304 includes one or more computer readable media.

The computing system 300 also includes at least one media output component 308 for presenting information to the user 301. The media output component 308 is any component capable of conveying information to the user 301. In some embodiments, the media output component 308 includes an output adapter such as a video adapter and/or an audio adapter. An output adapter is operatively coupled to the processor 302 and operatively connectable to an output device such as a display device, a liquid crystal display (LCD), organic light emitting diode (OLED) display, or "electronic ink" display, or an audio output device, a speaker, or headphones.

In some embodiments, the computing system 300 includes an input device 310 for receiving input from the user 301. The input device 310 may include, for example, a touch sensitive panel, a touch pad, a touch screen, a stylus, a photographic element or camera, an optical sensor, a gyroscope, an accelerometer, a position detector, a keyboard, a pointing device, a mouse, or an audio input device. A single component such as a touch screen may function as both an output device of the media output component 308 and the input device 310. The computing system 300 may also include a transceiver 312 (broadly, a communication interface), which is communicatively connectable to a remote device such as the cardholder computing device 102 (shown in FIG. 1). The transceiver 312 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 304 are, for example, computer readable instructions for providing a user interface to the user 301 via the media output component 308 and, optionally, receiving and processing input from the input device 310. A user interface may include, among other possibilities, a web browser and various software applications. Web browsers enable users to display and interact with media and other information typically embedded on a web page or a website. The various software applications allow the user 301 to interact with the computing system 300 to further communicate with the cardholder computing device 102, the open service computing system 112, etc. to facilitate providing various financial services to the cardholder 104 and, optionally, execute a transaction upon delivery of such services.

Figure 4:
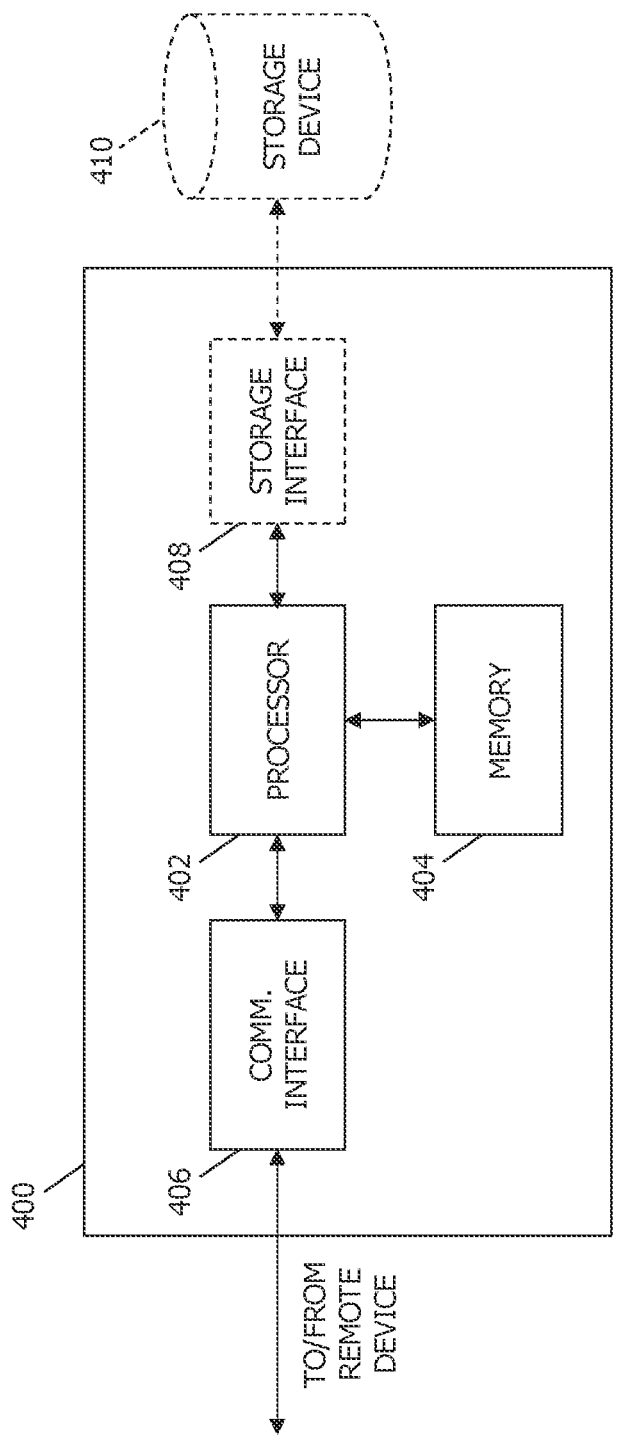
FIG. 4 is an example configuration of a server system for use in the network system shown in FIG. 1.

FIG. 4 is an example configuration of a server system 400, such as the database server 122 (shown in FIG. 1). In the example embodiment, the server system 400 includes a processor 402 for executing computer readable instructions. The computer readable instructions may be stored in a memory area 404, for example. The processor 402 includes one or more processing units (e.g., in a multi-core configuration) for executing the computer readable instructions. The computer readable instructions may be executed within a variety of different operating systems on the server system 400, such as UNIX, LINUX, Microsoft Windows®, etc. More specifically, the computer readable instructions may cause various data manipulations on data stored in a storage device 410 (e.g., create, read, update, and delete procedures). It should also be appreciated that upon initiation of a computer-based method, various computer readable instructions may be executed during initialization. Some operations may be required to perform one or more processes described herein, while other operations may be more general and/or specific to a programming language (e.g., C, C#, C++, Java, or other suitable programming languages, etc.).

The processor 402 is operatively coupled to a communication interface 406 such that the server system 400 can communicate with a remote device such as cardholder computing device 102, a computing system 300, or another server system. For example, the communication interface 406 may receive communications from the open service computing system 112.

The processor 402 is operatively coupled to the storage device 410. The storage device 410 is any computer-operated hardware suitable for storing and/or retrieving data. In some embodiments, the storage device 410 is integrated in the server system 400. In other embodiments, the storage device 410 is external to the server system 400 and is like the database 124 (shown in FIG. 1). For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In some embodiments, it is contemplated that the server system 400 is implemented as a software application. In such embodiments, the hardware described above, such as the processor 402, the memory area 404, the communication interface 406, and/or the storage interface 408 may be shared with the hardware components of a computing system 300, such as the processor 302, the memory device 304, and/or the transceiver 312.

Exemplary Computer-Implemented Methods

Figure 5:
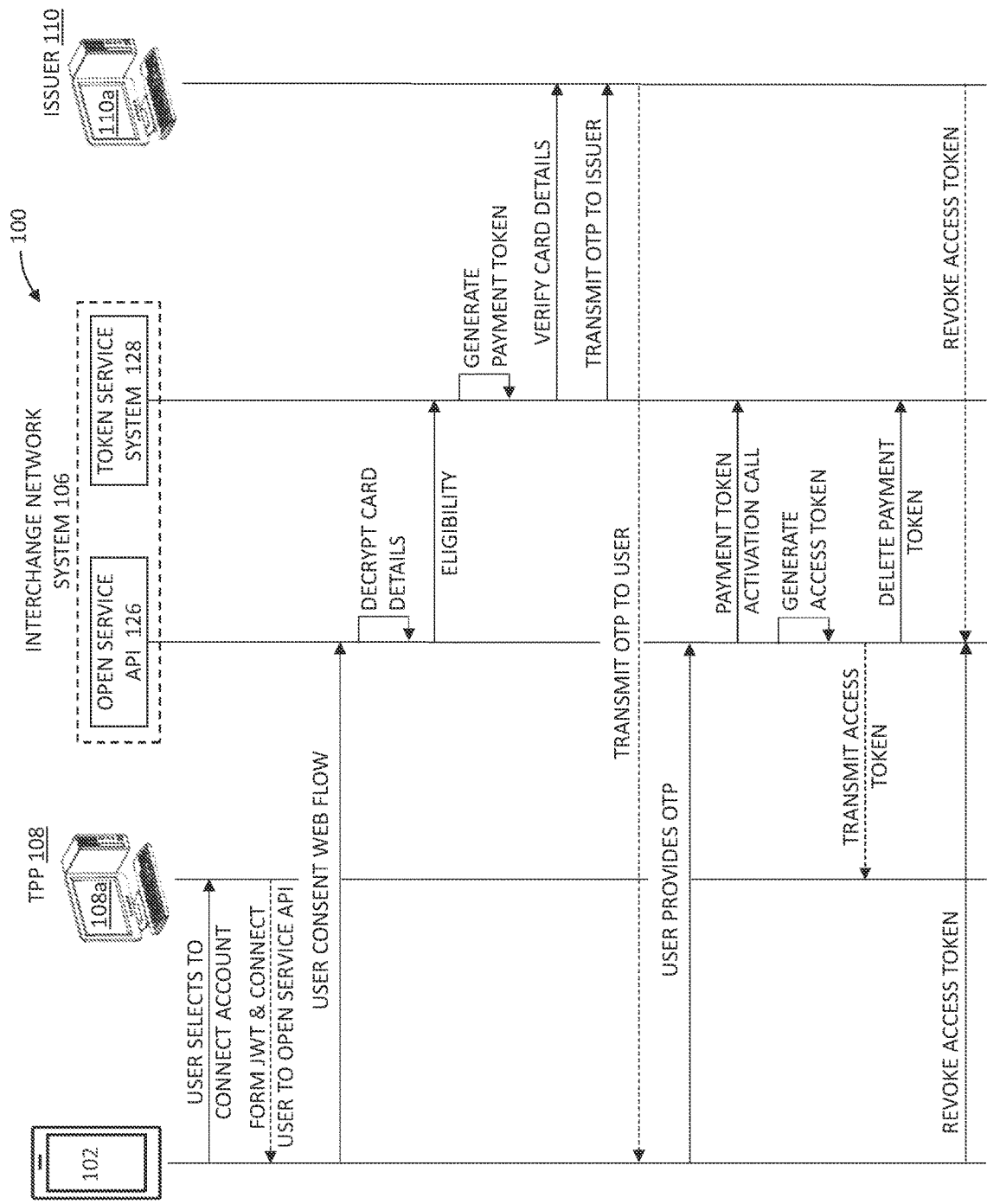
FIG. 5 depicts a flowchart illustrating various example actions performed by components of the network system shown in FIG. 1 to authenticate a cardholder and obtain cardholder consent for creating a digital access token.

FIG. 5 is a flowchart illustrating various example actions performed by components of the network system 100 to authenticate a cardholder and obtain cardholder consent for creating a digital access token, where a TPP has a cardholder's card details on file. In the exemplary embodiment, a cardholder selects to connect his or her account with a third party provider (TPP 108), and more particularly, a PCI compliant third party provider. As described herein, a PCI compliant third party provider is compliant with the Payment Card Industry Data Security Standard (PCI DSS). The TPP 108, in this instance, has the transaction card account details of the cardholder 104 stored on file (e.g., card-on-file). The transaction card account details include, for example, at least the cardholder's name and physical address, the primary account number (PAN), the card expiry date, and the card validation code (CVC).

In the exemplary embodiment, a computer of the TPP 108 (e.g., the TPP computing device 108a) receives an input from the cardholder computing device 102, for example, via the TPP App 116 over the network 114 (each shown in FIG. 1), indicating that the cardholder, such as the cardholder 104 (shown in FIG. 1), selected to connect a transaction card account to the TPP 108.

The TPP computing device 108a generates or forms a JSON web token (JWT) and launches a webSDK with the JWT within the TPP App 116. The webSDK is configured to connect the TPP App 116 to the interchange network system 106, and more particularly, to the open service API 126. The JWT is a data object that holds JSON (Java Script Object Notation) that asserts one or more claims (or fields). The JWT contains (in the claims) information concerning the access the TPP 108 is requesting and the encrypted transaction card account details the TPP 108 has on file. For example, the JWT may contain information indicating that the TPP 108 is requesting access to one or more of a cardholder's transaction alerts, transaction history, virtual card numbers, card controls, etc. Upon launching the webSDK with the JWT in the TPP App 116, an API call to the open service API 126 is initiated by the TPP App 116. The API call includes a request for authentication of the cardholder 104. Because the API call is provided with the JWT, the API call is secure. That is, the JWT provides for securely transmitting information between parties as a JSON object.

The cardholder 104, via the cardholder computing device 102, and more particularly, the TPP App 116, is presented with a consent screen to provide user consent and to agree to any presented terms and conditions of the consent. In one particular embodiment, the open service API 126 may integrate a user consent widget, lightbox, web-redirect, iframe, or the like, in the TPP App 116 to allow the cardholder 104 to provide his or her consent.

Upon receipt of the cardholder's consent, the open service API 126 decrypts the encrypted transaction card account details received in the JWT. The open service API 126 transmits the transaction card details to the token service system 128 to determine (e.g., check, verify, etc.) the eligibility of the transaction card (e.g., via the PAN) for having a digital access token generated and associated therewith. For example, the token service system 128 may compare the PAN (or transaction card details) against a range of enrolled PANs (or enrolled transaction cards) that are determined to be eligible for the digital access token service. Alternatively, the token service system 128 may verify that the issuer of the transaction card is enrolled in the digital access token service for its associated transaction cards. As is understood by one skilled in the art, there are various methods for determining the eligibility of a specific PAN for the digital access token service.

If the transaction card is eligible, the token service system 128 generates a payment token 132 (shown in FIG. 1) and stores it in a database, such as the database 124 (shown in FIG. 1). In one embodiment, the payment token 132 is stored in the data mapping table 136 along with the cardholder consent, transaction card details, token expiration, etc. As such, the payment token 132 is mapped to the transaction card, associated financial account, cardholder consent, etc. In some embodiments, the token service system 128 stores the payment in a suspended state. For example, a status of the stored payment token 132 is set or changed to a suspended state. As such, the payment token 132 is not able to be used until and unless it is further switched to an active or unsuspended state. In the exemplary embodiment, the payment token 132 is not usable until the cardholder 104 is authenticated.

As illustrated in FIG. 5, after the payment token 132 is generated, the token service system 128 communicates with the issuer 110 and transmits a card verification message to verify at least some of the transaction card details received from the cardholder 104 via the TPP App 116. For example, in one embodiment, the token service system 128 transmits one or more of a CVC value and cardholder address to the issuer for validation.

In the exemplary embodiment, if the issuer 110 confirms (i.e., validates) that the CVC and/or cardholder address match those stored by the issuer 110, the token service system 128 transmits an authentication request message to the issuer 110. For example, the token service system 128 generates an authentication ID (or one-time password (OTP)), embeds it in the authentication request message, and transmits it to the issuer to be used in cardholder authentication. In certain other embodiments, the authentication request message does not include an authentication ID, but rather a request that the issuer generate the authentication ID (or OTP) and transmit it to the cardholder for authentication. The issuer 110 authenticates the cardholder 104 using any method, including, for example, single factor authentication, multifactor authentication, biometrics, and the like. In such embodiments, the issuer further provides an authentication ID to the cardholder after authenticating the cardholder 104 using one of the methods described above. In addition, the authentication message transmitted to the cardholder computing device is also transmitted to the token service system 128.

The issuer 110 transmits the authentication ID (or OTP) to the cardholder 104, and more particularly, to the cardholder computing device 102. The authentication ID is be transmitted to the cardholder computing device 102 via any suitable technique, such as via an SMS or text message service, push notification, email, voice (e.g., via telephone call or voice message services), and the like. Upon receipt of the authentication ID, the cardholder 104 provides the authentication ID (or OTP) to the open service API 126 via the TPP App 116 to confirm authentication.

The open service API 126 transmits the received authentication ID to the token service system 128 via a payment token activation call to verify that the received authentication ID matches the generated authentication ID (e.g., either the token service system 128 generated authentication ID or the issuer 110 generated authentication ID). The token service system 128 compares the received authentication ID to the generated authentication ID. If the received authentication ID matches the generated authentication ID, the cardholder is authenticated. If the received authentication ID does not match, the cardholder is not authenticated and the token service system 128 deletes the payment token 132.

Upon authentication of the cardholder 104, the open service API 126 generates an access ID (or card reference), such as the digital access token 118, and stores it in a database, such as the database 124 (shown in FIG. 1). In one embodiment, the digital access token 118 is stored in the data mapping table 136 along with the cardholder consent, transaction card details, token expiration, etc., which is associated with the payment token 132. As such, the digital access token 118 is mapped to the transaction card, associated financial account, cardholder consent, etc. for recall when used in subsequent API calls for access to cardholder financial account data.

After the digital access token 118 is generated, the open service API 126 transmits the digital access token 118 to the TPP 108. For example, the open service API 126 may communicate with the TPP computing device 108a to transmit the digital access token 118 thereto. The TPP 108 stores the digital access token 118 for subsequent use in API calls to the open service API 126 for retrieval of financial account data of the cardholder, subject to the cardholder consent associated with the digital access token 118. The open service API 126 then transmits a payment token delete call to the token service system 128, requesting that the payment token 132 be deleted.

In certain embodiments, the cardholder 104 and/or the issuer 110 may revoke the digital access token 118. That is, the cardholder 104 and/or the issuer 110 may transmit a token revocation request message to the open service API 126 to request that the digital access token be suspended and/or deleted such that the digital access token 118 can no longer be used to retrieve cardholder financial account data. In one embodiment, the cardholder 104 may transmit a revocation request message to the open service API 126 via the TPP App 116. In another embodiment, the cardholder 104 may log in to an issuer App and request that the digital access token 118 be revoked. In such an embodiment, the issuer 110 transmits a revocation request to the open service API 126 to request that the digital access token 118 be suspended and/or deleted. It is also noted that the issuer 110 may request revocation of the digital access token 118 on its own, rather than a request being initiated by the cardholder 104.

Upon receipt of the token revocation request message, the open service API 126 instructs the token service system 128 to revoke or delete the digital access token 118. For example, the token service system 128 may change the status to the digital access token to a suspended state or delete the digital access token from the data mapping table 136 in the database 124.

Figure 6:
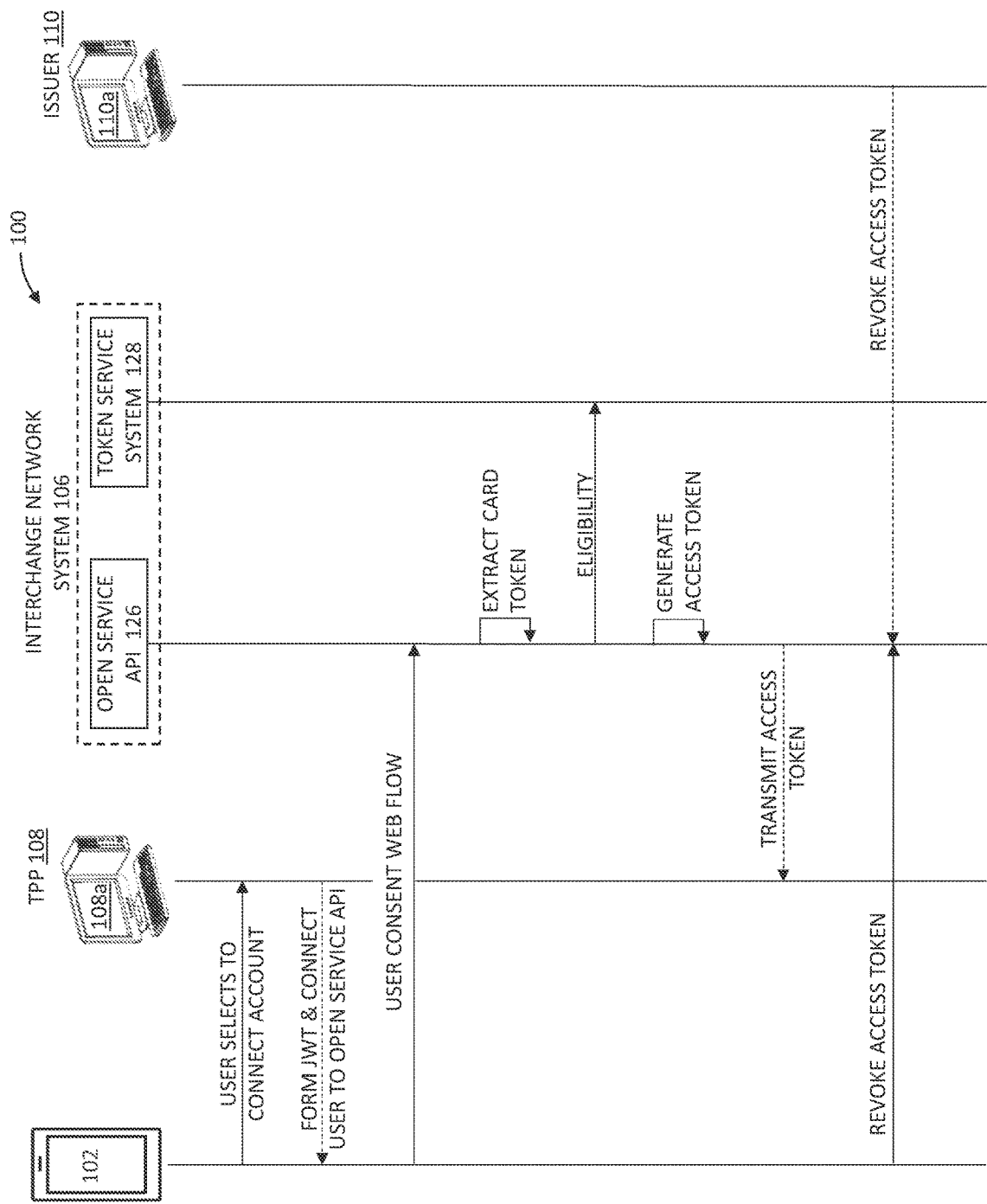
FIG. 6 depicts a flowchart illustrating various example actions performed by components of the network system shown in FIG. 1 to obtain cardholder consent for creating a digital access token, where a third party provider has a cardholder's card details on file as a transaction card token.

FIG. 6 is a flowchart illustrating various example actions performed by components of the network system 100 to obtain cardholder consent for creating a digital access token, where a TPP has a cardholder's card details on file as a transaction card token. Thus, cardholder authentication may be omitted. In the exemplary embodiment, a cardholder selects to connect to his or her account with a third party provider (TPP 108), and more particularly, a PCI compliant third party provider. As described herein, a PCI compliant third party provider is compliant with the Payment Card Industry Data Security Standard (PCI DSS). The TPP 108, in this instance, has the transaction card account details of the cardholder 104 stored on file (e.g., card-on-file) as a transaction card token (i.e., card details already tokenized).

A computer of the TPP 108 (e.g., the TPP computing device 108*a*) receives an input from the cardholder computing device 102, for example, via the TPP App 116 over the network 114 (each shown in FIG. 1), indicating that the cardholder, such as the cardholder 104 (shown in FIG. 1), selected to connect a transaction card account to the TPP 108.

The TPP computing device 108*a* generates or forms a JSON web token (JWT) and launches a webSDK with the JWT within the TPP App 116. The webSDK is configured to connect the TPP App 116 to the interchange network system 106, and more particularly, to the open service API 126. The JWT is a data object that holds JSON (Java Script Object Notation) that asserts one or more claims (or fields). The JWT contains (in the claims) information concerning the access the TPP 108 is requesting and the transaction card token the TPP 108 has on file. For example, the JWT may contain information indicating that the TPP 108 is requesting access to one or more of a cardholder's transaction alerts, transaction history, virtual card numbers, card controls, etc. Upon launching the webSDK with the JWT in the TPP App 116, an API call to the open service API 126 is initiated by the TPP App 116. The API call includes a request for authentication of the cardholder 104. Because the API call is provided with the JWT, the API call is secure. That is, the JWT provides for securely transmitting information between parties as a JSON object.

The cardholder 104, via the cardholder computing device 102, and more particularly, the TPP App 116, is presented with a consent screen to provide user consent and to agree to any presented terms and conditions of the consent. In one particular embodiment, the open service API 126 may integrate a user consent widget, lightbox, web-redirect, iframe, or the like, in the TPP App 116 to allow the cardholder 104 to provide his or her consent.

Upon receipt of the cardholder's consent, the open service API 126 extracts the transaction card token from the JWT. The open service API 126 transmits the transaction card token to the token service system 128 to determine (e.g., check, verify, etc.) the eligibility of the transaction card (e.g., via the PAN) for having a digital access token generated and associated therewith. For example, the token service system 128 may identify the PAN from the token and compare the PAN (or other transaction card details) against a range of enrolled PANs (or enrolled transaction cards) that are determined to be eligible for the digital access token service. Alternatively, the token service system 128 may verify that the issuer of the transaction card is enrolled in the digital access token service for its associated transaction cards. As is understood by one skilled in the art, there are various methods for determining the eligibility of a specific PAN for the digital access token service.

If the transaction card is eligible, the open service API 126 generates an access ID (or card reference), such as the digital access token 118, based on the transaction card token and stores it in a database, such as the database 124 (shown in FIG. 1). In one embodiment, the digital access token 118 is stored in the data mapping table 136 along with the cardholder consent, transaction card details, token expiration, etc., which is associated with the transaction card token extracted from the JWT. As such, the digital access token 118 is mapped to the transaction card, associated financial account, cardholder consent, etc. for recall when used in subsequent API calls for access to cardholder financial account data.

After the digital access token 118 is generated, the open service API 126 transmits the digital access token 118 to the TPP 108. For example, the open service API 126 may communicate with the TPP computing device 108*a* to transmit the digital access token 118 thereto. The TPP 108 stores the digital access token 118 for subsequent use in API calls to the open service API 126 for retrieval of financial account data of the cardholder, subject to the cardholder consent associated with the digital access token 118.

In certain embodiments, the cardholder 104 and/or the issuer 110 may revoke the digital access token 118. That is, the cardholder 104 and/or the issuer 110 may transmit a token revocation request message to the open service API 126 to request that the digital access token be suspended and/or deleted such that the digital access token 118 can no longer be used to retrieve cardholder financial account data. In one embodiment, the cardholder 104 may transmit a revocation request message to the open service API 126 via the TPP App 116. In another embodiment, the cardholder 104 may log in to an issuer App and request that the digital access token 118 be revoked. In such an embodiment, the issuer 110 transmits a revocation request to the open service API 126 to request that the digital access token 118 be suspended and/or deleted. It is also noted that the issuer 110 may request revocation of the digital access token 118 on its own, rather than a request being initiated by the cardholder 104.

Upon receipt of the token revocation request message, the open service API 126 instructs the token service system 128 to revoke or delete the digital access token 118. For example, the token service system 128 may change the status to the digital access token to a suspended state or delete the digital access token from the data mapping table 136 in the database 124.

Figure 7:
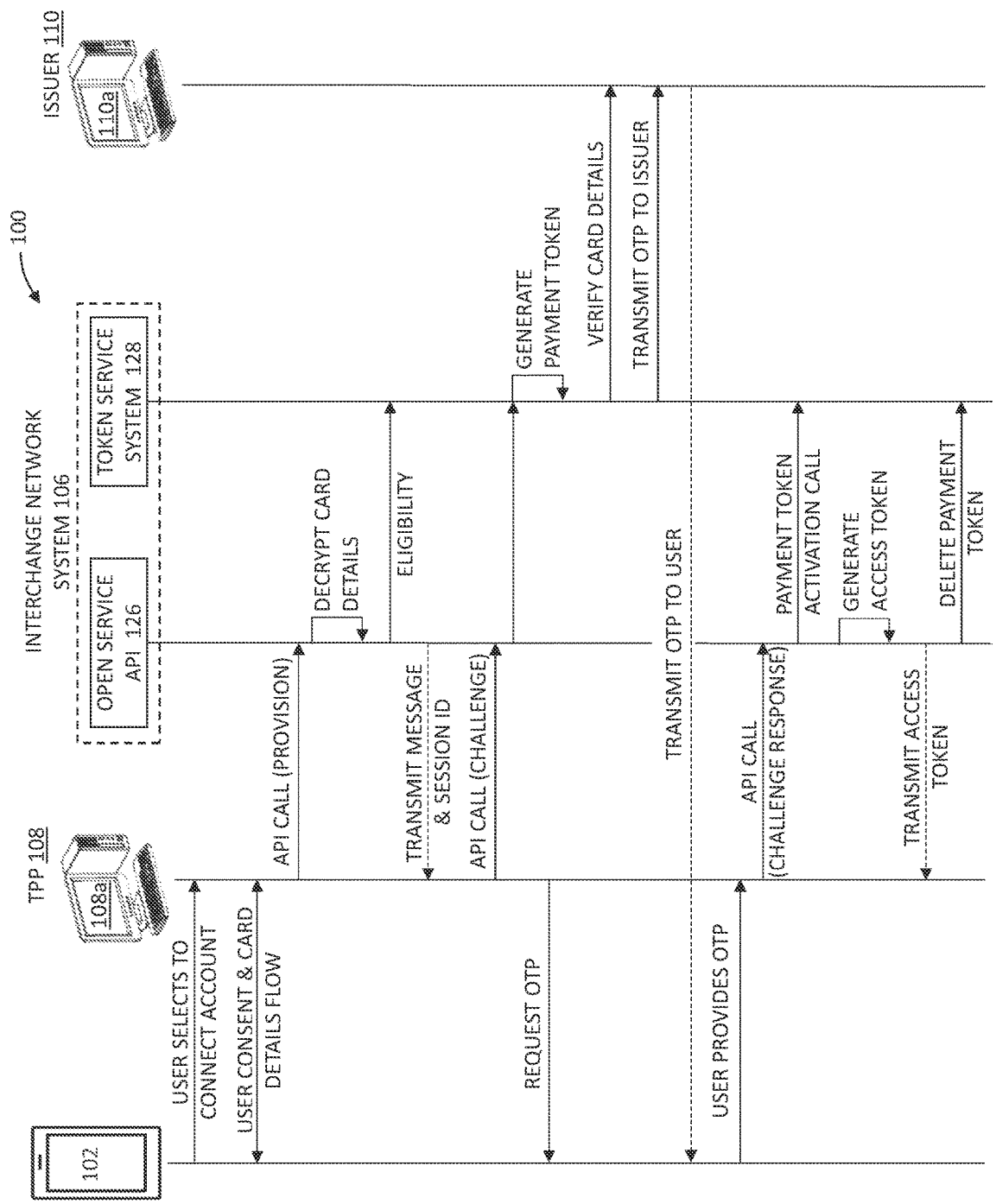
FIG. 7 depicts a flowchart illustrating various example actions performed by components of the network system shown in FIG. 1 to authenticate a cardholder and obtain cardholder consent for creating a digital access token.

FIG. 7 is a flowchart illustrating various example actions performed by components of the network system 100 to authenticate a cardholder and obtain cardholder consent for creating a digital access token. In the exemplary embodiment, a cardholder selects to connect to his or her account with a third party provider (TPP 108), and more particularly, a "trusted" third party provider. As described herein, a trusted TPP may initiate an API approach to request account access and receive the digital access token (e.g., the digital access token 118). Using the API approach, the trusted TPP 108 controls the cardholder experience (e.g., via the user interface 134) when a cardholder, such as the cardholder 104, selects to grant access to his or her financial account data.

In the exemplary embodiment, a computer of the TPP 108 (e.g., the TPP computing device 108*a*) receives an input from the cardholder computing device 102, for example, via the TPP App 116 over the network 114 (each shown in FIG. 1), indicating that the cardholder, such as the cardholder 104 (shown in FIG. 1), selected to connect a transaction card account to the TPP 108.

The TPP computing device 108*a* presents to the cardholder 104, by the TPP App 116 via the user interface 134, a consent screen to provide user consent and to agree to any presented terms and conditions of the consent. Upon receipt of the cardholder's consent, the TPP computing device 108a then presents to the cardholder 104, by the TPP App 116 via the user interface 134, an input screen to enter and submit the cardholder's transaction card details associated with the account to which the cardholder 104 is granting access to the TPP 108. In the exemplary embodiment, the transaction card details includes one or more of a primary account number (PAN), an expiry date, a card verification code (CVC), and the cardholder's name and address.

The TPP computing device 108a encrypts the transaction card details and includes them in an API call to the open service API 126. The API call includes a request to provision a digital access token, such as the digital access token 118, for the corresponding transaction card details. The open service API 126 decrypts the encrypted transaction card details and transmits the transaction card details to the token service system 128 to determine (e.g., check, verify, etc.) the eligibility of the transaction card (e.g., via the PAN) for having a digital access token generated and associated therewith. For example, the token service system 128 may compare the PAN (or transaction card details) against a range of enrolled PANs (or enrolled transaction cards) that are determined to be eligible for the token service. Alternatively, the token service system 128 may verify that the issuer of the transaction card is enrolled in the token service for its associated transaction cards. As is understood by one skilled in the art, there are various methods for determining the eligibility of a specific PAN for a token service.

If the transaction card is eligible, the token service system 128 transmits a message to the TPP computing device 108a indicating the transaction card is eligible for the digital access token service. In the exemplary embodiment, the message may include a session identifier (ID) for use in subsequent API calls. Upon receipt of the message and session ID, the TPP computing device 108a initiates a card challenge API call, including the session ID, to the open service API 126. The API call includes a request to authenticate the cardholder 104 associated with the transaction card details. The TPP computing device 108a also presents to the cardholder 104, by the TPP App 116 via the user interface 134, an authentication request screen requesting the cardholder 104 to input an authentication ID received from the issuer 110.

Upon receipt of the card challenge API call, the token service system 128 generates a payment token 132 (shown in FIG. 1) and stores it in a database, such as the database 124 (shown in FIG. 1). In one embodiment, the payment token 132 is stored in the data mapping table 136 along with the cardholder consent, transaction card details, token expiration, etc. As such, the payment token 132 is mapped to the transaction card, associated financial account, cardholder consent, etc. In some embodiments, the token service system 128 stores the payment in a suspended state. For example, a status of the stored payment token 132 is set or changed to a suspended state. As such, the payment token 132 is not able to be used until and unless it is further switched to an active or unsuspended state. In the exemplary embodiment, the payment token 132 is not usable until the cardholder 104 is authenticated.

As illustrated in FIG. 7, after the payment token 132 is generated, the token service system 128 communicates with the issuer 110 and transmits a card verification message to verify at least some of the transaction card details received from the cardholder 104 via the TPP App 116. For example, in one embodiment, the token service system 128 transmits one or more of a CVC value and cardholder address to the issuer for validation.

In the exemplary embodiment, if the issuer 110 confirms (i.e., validates) that the CVC and/or cardholder address match those stored by the issuer 110, the token service system 128 transmits an authentication request message to the issuer 110. For example, the token service system 128 generates an authentication ID (or one-time password (OTP)), embeds it in the authentication request message, and transmits it to the issuer to be used in cardholder authentication. In certain other embodiments, the authentication request message does not include an authentication ID, but rather a request that the issuer generate the authentication ID (or OTP) and transmit it to the cardholder for authentication. The issuer 110 authenticates the cardholder 104 using any method, including, for example, single factor authentication, multifactor authentication, biometrics, and the like. In such embodiments, the issuer further provides an authentication ID to the cardholder after authenticating the cardholder 104 using one of the methods described above. In addition, the authentication message transmitted to the cardholder computing device 102 is also transmitted to the token service system 128.

The issuer 110 transmits the authentication ID (or OTP) to the cardholder 104, and more particularly, to the cardholder computing device 102. The authentication ID is be transmitted to the cardholder computing device 102 via any suitable technique, such as via an SMS or text message service, push notification, email, voice (e.g., via telephone call or voice message services), and the like. Upon receipt of the authentication ID, the cardholder 104 provides the authentication ID (or OTP) to the TPP 108 via the TPP App 116 to confirm authentication.

After the TPP 108 receives the authentication ID from the cardholder 104, the TPP computing device 108a initiates a challenge response API call, including the session ID and the authentication ID, to the open service API 126. The API call includes a request for access token 118. The open service API 126 transmits the received authentication ID to the token service system 128 via a payment token activation call to verify that the received authentication ID matches the generated authentication ID (e.g., either the token service system 128 generated authentication ID or the issuer 110 generated authentication ID). The token service system 128 compares the received authentication ID to the generated authentication ID. If the received authentication ID matches the generated authentication ID, the cardholder is authenticated. If the received authentication ID does not match, the cardholder is not authenticated and the token service system 128 deletes the payment token 132.

Upon authentication of the cardholder 104, the open service API 126 generates an access ID (or card reference), such as the digital access token 118, and stores it in a database, such as the database 124 (shown in FIG. 1). In one embodiment, the digital access token 118 is stored in the data mapping table 136 along with the cardholder consent, transaction card details, token expiration, etc., which is associated with the payment token 132. As such, the digital access token 118 is mapped to the transaction card, associated financial account, cardholder consent, etc. for recall when used in subsequent API calls for access to cardholder financial account data.

After the digital access token 118 is generated, the open service API 126 transmits the digital access token 118 to the TPP 108. For example, the open service API 126 may communicate with the TPP computing device 108a to transmit the digital access token 118 thereto. The TPP 108 stores the digital access token 118 for subsequent use in API calls to the open service API 126 for retrieval of financial account data of the cardholder, subject to the cardholder consent associated with the digital access token 118. The open service API 126 then transmits a payment token delete call to the token service system 128, requesting that the payment token 132 be deleted.

As described above with reference to FIGS. 5 and 6, in certain embodiments, the cardholder 104 and/or the issuer 110 may revoke the digital access token 118 by transmitting a token revocation request message to the open service API 126 to request that the digital access token 118 be suspended and/or deleted such that the digital access token 118 can no longer be used to retrieve cardholder financial account data. Upon receipt of the token revocation request message, the open service API 126 instructs the token service system 128 to revoke or delete the digital access token 118.

The systems and methods described above provide for generating a digital access token based on cardholder consent and authentication. The access token allows third party providers (TPPs) to retrieve certain financial account data of a cardholder, wherein the financial account data is associated with a selected cardholder's transaction card that the TPP has on file. The access token is limited to the consent provided by the authenticated cardholder, and the consent can be revoked by the cardholder and/or the transaction card issuer upon request. As described herein, the digital access tokens facilitate enabling TPPs to use financial data services of an interchange network system whether or not the transaction card issuer participates in the process. In addition, the disclosed techniques allow the fraud controls/models of the interchange network system and the issuer to be used when generating the digital access tokens and in subsequent data requests vis APIs of the interchange network system.

Figure 8:
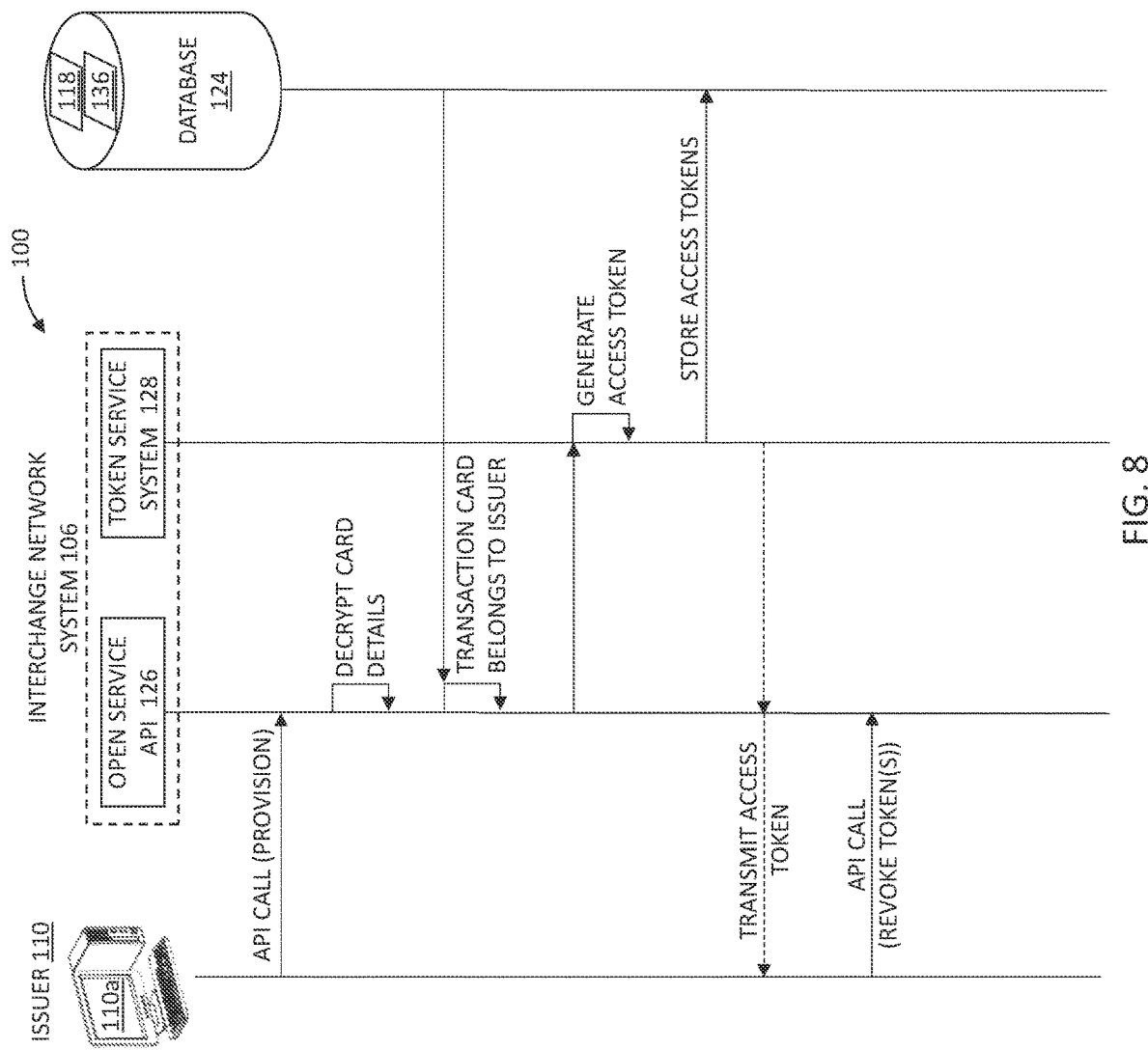
FIG. 8 depicts a flowchart illustrating various example actions performed by components of the network system shown in FIG. 1 to enable an issuer to request the creation of one or more digital access tokens for one or more of the issuer's associated transaction card accounts.

FIG. 8 is a flowchart illustrating various example actions performed by components of the network system 100 to enable an issuer, such as the issuer 110, to request the creation of one or more digital access tokens for one or more of the issuer's associated transaction card accounts. The issuer 110 may request bulk provisioning of its transaction card accounts and/or revoke one or more digital access tokens corresponding to one or more of its associated transaction card accounts.

In the exemplary embodiment, the issuer 110 may initiate an API approach to request one or more digital access tokens (e.g., the digital access tokens 118) for its customer transaction card accounts. Because the issuer 110 owns the transaction card accounts, the issuer does not need to request authentication from a cardholder, such as the cardholder 104, before accessing the transaction card account data.

In the exemplary embodiment, using the API approach, the issuer 110 (via the issuer computing device 110a) initiates a provisioning request API call to the open service API 126 to provision a digital access token, such as the digital access token 118, for the corresponding transaction card details included in the API call. More particularly, the issuer 110 may encrypt transaction card account details (e.g., for one or more transaction card accounts) and include them in the API call to the open service API 126. The transaction card account details may include one or more of a primary account number (PAN), an expiry date, and/or a card verification code (CVC). The API call may also include a client identifier (e.g., a client ID) that is used to identify the issuer 110. The client ID may also be used to verify that the transaction card accounts associated with the transaction card account details included in the API call belong to the issuer 110. For example, in one embodiment, a database, such as the database 124 (shown in FIG. 1), may include data mapping a Bank Identification Number (BIN) range to the client ID.

The open service API 126 decrypts the encrypted transaction card details and checks that each of the transaction card accounts included in the API call belongs to the requesting issuer 110. In particular, the open service API 126 checks the BIN mapping data stored in the database 124 to verify that the requesting client ID maps to the transaction card accounts. Based on the transaction card accounts mapping to the client ID, the open service API 126 transmits the transaction card details to the token service system 128 for generation of the access tokens 118.

For each of the transaction card accounts associated with the request, the token service system 128 generates an access ID (or card reference), such as the digital access token 118. Each digital access token 118 is stored in a database, such as the database 124. In one embodiment, the digital access token 118 is stored in the data mapping table 136 along with other data, such as the transaction card details, access token expiration, associated access permissions, etc. As such, the digital access token 118 is mapped to the transaction card, associated financial account, etc. for recall when used in subsequent API calls for access to cardholder financial account data.

After the digital access token (or tokens) 118 is (are) generated, the open service API 126 transmits the digital access token(s) 118 to the issuer 110. For example, the open service API 126 may communicate with the issuer computing device 110a to transmit the digital access token(s) 118 thereto. The issuer 110 stores the digital access token(s) 118 for subsequent use in API calls to the open service API 126 for retrieval of financial account data corresponding to the transaction card account, subject to the access permissions associated with the digital access token 118.

As described above with reference to FIGS. 5-7, in certain embodiments, the issuer 110 may revoke the digital access token(s) 118 by transmitting a token revocation request message to the open service API 126 to request that the digital access token 118 be suspended and/or deleted such that the digital access token 118 can no longer be used to retrieve cardholder financial account data. Upon receipt of the token revocation request message, the open service API 126 instructs the token service system 128 to revoke or delete the digital access token 118.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is

Having thus described various embodiments of the disclosure, what is claimed as new and desired to be protected by Letters Patent includes the following:

1. A system comprising:
a data store comprising financial account data of a plurality of cardholders;
a token service system;
a third-party provider (TPP) computing device comprising a first one or more processors and a first one or more non-transitory computer-readable media having computer-executable instructions that when executed by the first one or more processors, causes the first one or more processors to perform the operations of:
generating a JSON web token (JWT), the JWT including a request to access financial account data of a cardholder of the plurality of cardholders from the data store; and
launching, via the JWT, a web SDK within a TPP application executing on a cardholder computing device; and
an open service computing system including a database, an open service application programming interface (API),
a second one or more processors, and a second one or more non-transitory computer readable media storing computer-executable instructions that when executed by the second one or more processors, cause the second one or more processors to perform the operations of:
executing the open service API;
receiving, via the executing open service API, a request to authenticate a cardholder of the plurality of cardholders from the TPP computing device, the request including encrypted transaction card details corresponding to a transaction card of the cardholder and the JWT, the encrypted-transaction card details being associated with the financial account data of the cardholder;
presenting, via the executing open service API, on the cardholder computing device, a consent screen including a list of one or more data services;
receiving, via the executing open service API, a selection of one or more data services of the list of one or more data services associated with the request;
receiving, via the executing open service API, a consent message from the cardholder computing device, the consent message including cardholder selection of one or more data services of the list of one or more data services associated with the request;
after receiving the selection, decrypting, via the executing open service API, the encrypted transaction card details associated with the request; and
transmitting, via the executing open service API, the decrypted transaction card details to the token service system;
the token service system comprising a third one or more processors and a third one or more non-transitory computer readable media storing computer-executable instructions that when executed by the third one or more processors causes the third one or more processors to perform the operations of:
based on the received transaction card details, generating a payment token, wherein the payment token is associated with the financial account data;
authenticating the cardholder, wherein authenticating comprises:
receiving an authentication identifier (ID) from an issuer computer;
receiving a second ID from the cardholder computing device; and
determining that the authentication ID and the second ID are the same;
after authenticating the cardholder, generating a digital access token;
generating an association between the digital access token, the payment token, and the received transaction card details, and storing the payment token and the association in the database; and
after storing the association in the database, transmitting the digital access token to the TPP computing device.

2. The system in accordance with claim 1,
the third one or more non-transitory computer readable media storing executable instructions that when executed by the third one or more processors causes said third one or more processors to further perform an operation of determining, the eligibility of the transaction card for a token service.

3. The system in accordance with claim 1,
the third one or more non-transitory computer readable media storing computer-executable instructions that when executed by the third one or more processors causes said third one or more processors to further perform an operation of transmitting a card verification message to the issuer computer.

4. The system in accordance with claim 1,
the second one or more non-transitory computer readable media storing computer-executable instructions that when executed by the second one or more processors causes the second one or more processors to further perform the operations of:
storing the digital access token in a data mapping table in the database; and
associating the digital access token to the transaction card details, the financial account data, and a digital access token expiration date.

* * * * *